United States Patent Office 3,732,252
Patented May 8, 1973

3,732,252
METHOD FOR THE SYNTHESIS OF TRIOXAN
Hiroyasu Komazawa and Osamu Matsuno, Fuji, Japan, assignors to Polyplastics Co., Ltd., Osaka, Japan
No Drawing. Filed Dec. 29, 1971, Ser. No. 213,728
Int. Cl. C07d 21/00
U.S. Cl. 260—340                                1 Claim

ABSTRACT OF THE DISCLOSURE

A process for synthesizing trioxan by heating an aqueous solution of 25–80% by weight of formaldehyde in the presence of 1–20% by weight of an acidic substance as catalyst, characterized by adding one or more of soluble organic compounds such as alcohols, ethers or esters having a dielectric constant of less than 40 in such an amount as defined below:

(1) $\geq 0.0233$ (wt. percent) $\times$ (wt. percent of water in the reaction mixture) for the compound having a dielectric constant of less than 10.

(2) $\geq 0.00233 \times$ (dielectric constant) $\times$ (wt. percent of water in the reaction mixture) for the compound having a dielectric constant of 10.1–20.

(3) $\geq \{0.0325$ (dielectric constant$-20) + 0.0465\} \times$ (wt. percent of water in the reaction mixture) for the compound with a dielectric constant of 20.1–40.

---

The present invention relates to an improved method for synthesizing trioxan from an aqueous formaldehyde solution containing an acidic catalyst with good conversion.

Trioxan is in general known as a useful monomer for producing polyoxymethylenes (poly-formaldehydes) and various copolymers of formaldehyde. Polyoxymethylenes are thermoplastic high polymers having both excellent mechanical strength and excellent moldability and they have been widely used as functional mechanical parts of automobiles, electrical appliance, industrial machines and the like.

According to "Formaldehyde" written by J. Frederik Walker (Reinhold, New York, third edition, 1964, pp. 198–199), trioxan was synthesized by heating an aqueous formaldehyde solution (60–65 weight percent) in the presence of an acidic catalyst (2 weight percent). As other methods for the synthesis of trioxan, there have been also proposed a process in which a concentrated formaldehyde aqueous solution is reacted in the presence of an emulsifier which acts as an acid and an inert oily substance under a high speed agitation, while keeping the reaction system in emulsion state at a temperature of 95–150° C. (refer to Japanese patent publication No. 13,743/1965); a process in which an aqueous formaldehyde solution is reacted in an emulsified state by an inert and stable emulsifier, using a strongly acidic organic or inorganic acid as catalyst at 95–150° C. under a vigorous stirring (refer to Japanese patent publication No. 17,394/1965); and a process in which an aqueous formaldehyde solution is admixed with soluble salts (refer to Japanese patent publication No. 27,390/1969).

Generally in such prior methods for the synthesis of trioxan, an aqueous highly concentrated formaldehyde solution is reacted in the presence of an acidic catalyst of 1–8% by weight at a reaction temperature of 95–150° C. In this reaction, there would be established within a relatively short time a chemical equilibrium between formaldehyde and trioxan produced therefrom. However, since the conversion ratio from formaldehyde to trioxan is generally low, unreacted formaldehyde had to be separated from the produced trioxan, recycled and recharged into the vessel for the trioxan synthesis.

Accordingly, the synthesis of trioxan by these prior art methods will require a tremendous large sum of fund in order to obtain a definite unit amount of trioxan and will require large amounts of steam and extraction solvent for separating unreacted materials, thus providing only a relatively expensive monomer.

For the purpose of increasing the conversion ratio, there have been proposed various methods. For instance, if the concentration of formaldehyde is increased, it will give a better conversion ratio. However, in such a method, paraformaldehyde will be easily deposited in the reaction vessel and also around the opening thereof, which will cause various drawbacks in the apparatus, thus making impossible the stable operation. Further, in order to enhance the convension ratio, there has been proposed to increase the acid catalyst concentration, but such a procedure is apt to accompany a cause of corrosion for the apparatus.

Still further, a method where an aqueous highly concentrated formaldehyde solution is admixed with an oily component and the reaction is carried out in a two component system may bring a fairly good result just in a small scale experiment, but, in a large industrial apparatus, there will be required a strong and high-speed agitation device in order to keep the reaction system in emulsion, which will accompany various mechanical difficulties.

Moreover, the strong agitation may cause foaming of the reaction solution in the reaction vessel and it will not be easy to determine and keep optimum reaction conditions, because it is a heterogenous phase reaction.

Further, the above-mentioned method of admixing a soluble salt into the solution tends to deposit paraformaldehyde, which will make is difficult to maintain the operational efficiency of the manufacturing plants.

The inventors have studied various methods for improving the process for the synthesis of trioxan to overcome the difficulties as described above and discovered a novel method for the synthesis of trioxan in which an organic substance soluble in an aqueous formaldehyde solution and having a dielectric constant of less than 40 is added to the reaction system for the purpose of modifying the mechanism of the synthetic reaction itself, thus increasing the trioxan concentration at equilibrium in the reaction mixture.

This reaction mechanism has not yet been fully explicated, but it is assumed that, in the synthesis of trioxan from an aqueous formaldehyde solution, a lowered dielectric constant of the reaction system lower than conventional methods would exert a good influence on the procedure of activating formaldehyde or paraformaldehyde at equilibrium in the reaction system, that is, a transitional state from formaldehyde to trioxan.

Further, as another assumption of the reaction mechanism, it is supposed that such organic substance would have a stabilizing action on paraformaldehyde in the concentrated aqueous formaldehyde solution, or it would suppress a reverse reaction from the produced trioxan to formaldehyde.

The reaction system of this invention constitute a homogeneous phase and consequently there is no need of such a high-speed agitation, etc. as in the case of forming an emulsion state by adding an oily component to the system mentioned above. The organic compounds preferably used for this invention are those capable of creating a homogeneous state with an formaldehyde aqueous solution, such as alcohols, esters and ethers having a dielectric constant below 40. This dielectric constant is the value which is determined at 20° C. by a low frequency expressed by c.g.s. esu.

The ethers to be used in this invention include 1,4-dioxane, tetrahydrofuran, tetrahydropyran, dioxolan, ethyleneglycolmonomethyl ether, ethyleneglycolmonoethyl ether, ethyleneglycoldiethyl ether, ethyleneglycolisopropyl ether, ethyleneglycolmonobutyl ether, diethyleneglycomonobutyl ether, diethyleneglycoldimethyl ether, diethyleneglycoldiethyl ether, triethyleneglycolcolmonomethyl ether, triethyleneglycolmonoethyl ether, propyleneglycolmonomethyl ether, propyleneglycolmonoethyl ether, dipropyleneglycolmonoethyl ether, polypropyleneglycol, tripropyleneglycolmonomethyl ether, etc.

The esters to be used in this invention include γ-butyrolactone and esters of polyhydric alcohols (such as pentaerythritol, polyethyleneglycol, sorbitol, etc.) with higher fatty acids (such as palmitic acid, stearic acid, oleic acid, etc.).

Further, alcohols may be selected from methyl alcohol, ethyl alcohol, n-propyl alcohol, isopropyl alcohol, n-butyl alcohol, isobutyl alcohol, secondary butyl alcohol, third butyl alcohol, polybutyleneglycol (mol wt. of 150, 200, above 600), pentaerythritol, secondary amyl alcohol, tetrahydrofurfuryl alcohol, propyleneglycol, polyvinylalcohol, etc.

We have studied optimum amounts of these organic substances to be added to the reaction system and found that they depended upon dielectric constant values of such organic substances.

The relationship between the dielectric constant values and the minimum amounts of the above organic substances (that is, the minimum amount to be added to the reaction system) are as shown in the following table:

| Dielectric constant | Minimum amount of addition (percent by weight) |
|---|---|
| Below 10 | $\geq 0.0233 \times$ (wt. percent of water in the reaction mixture). |
| 10.1–20 | $\geq 0.00233 \times$ (dielectric constant) $\times$ (wt. percent of water in the reaction mixture). |
| 20.1–40 | $\geq \{0.0325 \times$ (dielectric constant $-20) - 0.0465\}$ (wt. percent of water in the reaction mixture). |

The effect of adding those organic compounds to the reaction system can be recognized in cases of either adding one kind or adding two or more kinds thereof, where a cumulative effect can be observed.

More particularly describing the improved synthetic method of this invention in which those organic substances are admixed, aqueous solutions of formaldehyde to be used as starting material include a concentrated aqueous formaldehyde solution obtained by condensing a commercially available aqueous formaldehyde solution by removing methanol therefrom, a concentrated aqueous formaldehyde solution obtained by dissolving paraformaldehyde into water, or an unreacted or recovered dilute aqueous solution of formaldehyde derived from the plants for synthesizing such formaldehyde derivatives as trioxan, pentaerythritol or others.

The formaldehyde content in these formaldehyde aqueous solutions is usually in the range of 25 to 80% by weight, but a characteristic feature of the improved synthetic method of this invention resides in that the conversion ratio into trioxan is higher even if the solution is within the range of a lower concentration.

These aqueous solutions are admixed with an acid catalyst or acid catalysts which may be selected from (1) above 1 wt. percent, preferably 3–10 wt. percent of inorganic acid such as sulfuric acid, phosphoric acid, hydrochloric acid or the like; (2) organic acids such as benzenesulfonic acid, toluenesulfonic acid, formic acid or the like; and (3) an ion-exchange resin or resins in the amount equivalent to the active content of available hydrogen ions inherent to the inorganic acid.

The reaction system is subjected to the reaction operation within a relatively short period of time, usually within 40 minutes, at a reaction temperature of 60 to 200° C., preferably at 60° to 150° C. Within the duration of the reaction, a chemical equilibrium will be attained between formaldehyde and its trimer viz trioxan. According to the present invention, the concentration of trioxan at equilibrium can be remarkably improved compared to the conversion ratio attainable in the prior methods.

For instance, according to Japanese patent publication No. 27,390/1969, where an aqueous solution of formaldehyde (its formaldehyde content is 50% by weight) containing an acid catalyst was admixed with LiCl, the conversion ratio was only 31 (g./1 kg. of formaldehyde) and, further, in an example where $MgCl_2$ was added, the conversion ratio was only 32 (g./1 kg. of formaldehyde). Compared to these conventional examples as described above, the improved synthetic method according to the present invention has shown conversion ratios of maximum 2.7 times as the aboves.

Generally, the higher concentration of formaldehyde in the reaction system shows the larger conversion ratio, and, further, in the case that an organic compound of the present invention is added to the reaction system, the ratio of formaldehyde to water actually increases in virtue of the added substance. However, the above larger conversion ratio is not due to such an increase of the ratio of formaldehyde to water, but it is attributable to the action of the organic substance as mentioned above.

The trioxan thus synthesized and present in the reaction system is subjected to ordinary separation procedures such as distillation, extraction and the like and then will be transferred to a higher refining processes.

In the improved synthetic method of this invention, compared with the prior art methods, no expensive equipment will be needed, but an usual reaction vessel could be sufficiently employed.

The synthetic method in accordance with this invention will be described hereunder with reference to examples, but this invention is not to be restricted to the following examples.

EXAMPLE 1

As the reaction vessel, an autoclave of 1 liter in volume capable of being maintained at a predetermined temperature was used. An aqueous solution of formaldehyde and 1,4-dioxane (dielectric constant of 2.2) as an organic additive were charged in this vessel. The temperature of this reaction system was elevated up to 100° C. and sulfuric acid was added quickly in this reaction system to start the reaction. The concentration composition of the reaction system consisted of formaldehyde of 50% by weight, sulfuric acid of 5% by weight, water of 40% by weight, and 1,4-dioxane of 0.125 time against the amount of water in the reaction system (the whole reaction composition was being composed of formaldehyde of 50% by weight, 1,4-dioxane of 5% by weight, sulfuric acid of 5% by weight and water of 40% by weight).

After admixing the above catalyst, a portion of the reaction mixture was taken out at each predetermined interval and the formaldehyde and trioxan contents in the reaction mixture were determined.

For comparison, the reaction system lacking the additive thereto was tested. As another reaction system to which glycerin (dielectric constant of 43) was added, the reaction system, consisting of formaldehyde of 50% by weight, sulfuric acid of 5% by weight, water of 40% by weight and glycerin of 0.125 times in quantity to the amount of water in the reaction system, was similarly tested.

According to the analytical results of these tests, in case of no additive, the conversion ratio of trioxan was 43 g., per 1 kg. of formaldehyde; in the case of adding glycerin as the additive, the conversion ratio was 48 g. per 1 kg. of formaldehyde; in the case of adding 1,4-dioxane, the conversion ratio was 62 g. per 1 kg. of formaldehyde. It will be thus understood that remarkable improvements were accomplished by the addition of 1,4-dioxane.

EXAMPLES 2 TO 4

The same reaction apparatus as in Example 1 was used. The reaction system consisting of formaldehyde 50% by weight, sulfuric acid 5% by weight and water 35% by weight was added with 1,4-dioxane of 0.286 times in quantity with respect to the amount of water of the reaction system, the results thereof were shown in Table 1.

Further, the same reaction system was added with ethyleneglycolmonomethylether of 0.125 times and ethyleneglycoldiethylether of 0.125 times in quantity with respect to the amount of water of the reaction system, respectively, the results thereof were shown in Table 1.

As well shown in the table, compared with the case of adding glycerin, so much improvement in respect of conversion ratio was observed.

TABLE 1

| Example No. | Concentration of formaldehyde (percent by weight) | Concentration of $H_2SO_4$ (percent by weight) | Organic substance Substance | Water in the system/organic substance | Dielectric constant of organic substance | Conversion ratio of trioxan (g./1 kg. $CH_2O$) |
|---|---|---|---|---|---|---|
| 2 | 50 | 5 | 1,4-dioxane | 0.286 | 2.2 | 80 |
| 3 | 50 | 5 | Ethyleneglycolmonomethylether | 0.125 | 16 | 60 |
| 4 | 50 | 5 | Ethyleneglycoldiethylether | 0.125 | 74 | 58 |

EXAMPLE 5

The same reaction vessel as used in Example 1 was used. The reaction system consisting of formaldehyde 25%, sulfuric acid 2.5% and water 22.5% was admixed with 1,4-dioxane as much 2.22 times in quantity as the water in the reaction system. The conversion ratio of trioxan was 68 g. per 1 kg. of formaldehyde.

Further, when the concentrations of formaldehyde and acid were low, the addition of a larger amount of the organic substances to the reaction system caused an improved conversion ratio.

EXAMPLES 6 TO 11

The same reaction vessel as used in Example 1 was used. The reaction system consisting of formaldehyde 50% by weight, sulfuric acid 5% by weight and water was added with methanol, polyethylene glycol (three kinds thereof having the molecular weights of 150, 200 and 600, respectively) and pentaerythritol. The above results were shown in Table 2, where the reaction conditions were similar to those in Example 1.

TABLE 2

| Example No. | Concentration of formaldehyde (percent by weight) | Concentration of $H_2SO_4$ (percent by weight) | Organic substance Substance | Water in the system/organic substance | Dielectric constant of organic substance | Conversion ratio of trioxan (g./1 kg. $CH_2O$) |
|---|---|---|---|---|---|---|
| 6 | 50 | 5 | Methanol | 1.25 | 32.6 | 52 |
| 7 | 50 | 5 | Polyethylene glycol (mol. wt. 150) | 0.125 | 37.7 | 60 |
| 8 | 50 | 5 | Polyethlene glycol (mol. wt. 200) | 0.125 | 37.7 | 58 |
| 9 | 50 | 5 | ...do... | 0.286 | 37.7 | 68 |
| 10 | 50 | 5 | Polyethylene glycol (mol. wt. 600) | 0.129 | 37.7 | 54 |
| 11 | 50 | 5 | Pentaerythritol | 0.129 | 28 | 56 |

As seen in this table, these conversion ratios were remarkably improved in comparison with the case of adding glycerin in Example 1.

EXAMPLE 12

The same reaction vessel as in Example 1 was used. The reaction system including formaldehyde of 50% by weight, sulfuric acid and water was added with γ-butyrolactone (dielectric constant of less than 30) of 0.125 times in quantity of the amount of water in the reaction system and subjected to the reaction under the same conditions as in Example 1. The conversion ratio of trioxan of 60 g. per 1 kg. of formaldehyde was obtained, from which an improvement of the conversion ratio was recognized.

EXAMPLE 13

The same reaction vessel as in Example 1 was used. A commercially available paraformaldehyde was dissolved in water, and a reaction system consisting of formaldehyde of 50% by weight, water of 40% by weight and sulfuric acid of 5% by weight was prepared and, 1,4-dioxane of 5% by weight (the amount of 0.125 times to that of water contained in the reaction system) was added to said reaction system and the mixture was then subjected to reaction. The conversion ratio of trioran was 60 (g./1 kg. formaldehyde). This conversion ratio should be recognized as an improvement in comparison to that in the case of adding glycerin in Example 1. Further, in the case of using paraformaldehyde, conversion ratios as soon as that in the case of using a concentrated aqueous formaldehyde solution was recognized.

What we claim is:

1. A process for synthesizing trioxan by heating an aqueous solution of 25–80 percent by weight of formaldehyde in the presence of 1–20 percent by weight of an acidic substance as catalyst, characterized by adding one or more of soluble organic compounds selected from the group consisting of cyclic and alkylene glycol ethers; gamma-butyrolactone; esters of polyhydric alcohols with higher fatty acids; alkanols; alkylene and polyalkylene glycols; cyclic alkenols and pentaerythritol, having a dielectric constant of less than 40 in such an amount as defined below:

(1) $\geq 0.0233$ (wt. percent) $\times$ (wt. percent of water in the reaction mixture) for the compound having a dielectric constant of less than 10;

(2) $\geq 0.00233 \times$ (dielectric constant) $\times$ (wt. percent of water in the reaction mixture) for the compound having a dielectric constant of 10.1–20;

(3) $\geq 0.0325$ (dielectric constant $-20$) $+ 0.0465 \times$ (wt. percent of water in the reaction mixture) for the compound with a dielectric constant of 20.1–40.

References Cited
UNITED STATES PATENTS 3,637,751   1/1972   Fuchs et al. ........ 260—340

HENRY R. JILES, Primary Examiner

M. M. CROWDER, Assistant Examiner